United States Patent
Hymer

(10) Patent No.: US 10,961,633 B2
(45) Date of Patent: Mar. 30, 2021

(54) RECOVERY OF COPPER FROM COPPER-CONTAINING SULFIDE ORES

(71) Applicant: The Doe Run Resources Corporation, St. Louis, MO (US)

(72) Inventor: Timothy Roy Hymer, Labadie, MO (US)

(73) Assignee: THE DOE RUN RESOURCES CORPORATION, St. Louis, MO (US)

(*) Notice: Subject to any disclaimer, the term of this patent is extended or adjusted under 35 U.S.C. 154(b) by 275 days.

(21) Appl. No.: 15/096,722

(22) Filed: Apr. 12, 2016

(65) Prior Publication Data

US 2016/0298248 A1    Oct. 13, 2016

Related U.S. Application Data

(60) Provisional application No. 62/146,953, filed on Apr. 13, 2015.

(51) Int. Cl.
| | | |
|---|---|---|
| *C25C 1/12* | (2006.01) | |
| *C22B 15/00* | (2006.01) | |
| *C22B 3/10* | (2006.01) | |

(52) U.S. Cl.
CPC ............ *C25C 1/12* (2013.01); *C22B 3/10* (2013.01); *C22B 15/0069* (2013.01); *C22B 15/0078* (2013.01); *C22B 15/0084* (2013.01); *Y02P 10/20* (2015.11)

(58) Field of Classification Search
USPC ..................................... 423/32–33
See application file for complete search history.

(56) References Cited

U.S. PATENT DOCUMENTS

| | | | | |
|---|---|---|---|---|
| 3,880,651 A | * | 4/1975 | Queneau | C22B 3/04 75/416 |
| 3,911,076 A | * | 10/1975 | Probert | C22B 3/14 423/53 |
| 3,927,170 A | * | 12/1975 | Dixon | C22B 15/0078 423/109 |
| 3,979,265 A | * | 9/1976 | Fonseca | C22B 3/12 205/582 |
| 4,023,964 A | * | 5/1977 | DeMarthe | C22B 3/0017 205/605 |

(Continued)

FOREIGN PATENT DOCUMENTS

| | | | | |
|---|---|---|---|---|
| EP | 0434831 A1 | * | 7/1991 | ............... C22B 3/00 |
| ES | 2014174 A | * | 6/1990 | ............... C22B 3/12 |

OTHER PUBLICATIONS

Liu et al, Dissolution kinetics of low grade complex copper ore in ammonia-ammonium chloride solution, Transactions of Nonferrous Metals Society of China, vol. 20, No. 5, May 2010, pp. 910-917 (Year: 2010).*

(Continued)

*Primary Examiner* — Harry D Wilkins, III
(74) *Attorney, Agent, or Firm* — Harness, Dickey & Pierce, P.L.C.

(57) ABSTRACT

A process for recovering copper from copper sulfide minerals, the method comprising the steps of leaching copper sulfide minerals with an aqueous solution of ammonium chloride containing cupric chloride at a temperature of between about 40° C. and about 95° C. at atmospheric pressure, to produce a solution of cuprous/cupric chloride.

17 Claims, 1 Drawing Sheet

(56) References Cited

U.S. PATENT DOCUMENTS

| | | | | |
|---|---|---|---|---|
| 4,230,487 A | * | 10/1980 | Demarthe | C22B 3/04 |
| | | | | 75/420 |
| 4,288,304 A | * | 9/1981 | DeMarthe | C22B 3/10 |
| | | | | 75/722 |
| 4,484,990 A | * | 11/1984 | Bultman | C25C 1/12 |
| | | | | 205/578 |
| 5,516,408 A | * | 5/1996 | Peckham | C22B 33/0005 |
| | | | | 205/101 |

OTHER PUBLICATIONS

Beckstead et al, Ammonia, oxidation leaching of chalcopyrite—reaction kinetics, Metallurgical Transactions B, vol. 8, No. 1, Mar. 1977, pp. 19-29 (Year: 1977).*

McDonald et al, Cupric chloride leaching of model sulfur compounds for simple copper ore concentrates, Metallurgical Transactions B, vol. 14, No. 4, Dec. 1983, pp. 559-570 (Year: 1983).*

Oishi et al, Recovery of high purity copper cathode from printed circuit boards using ammoniacal sulfate or chloride solutions, Hydrometallurgy, vol. 89, No. 1-2, Sep. 2007, pp. 82-88 (Year: 2007).*

Limpo et al, The CENIM-LNETI process: a new process for the hydrometallurgical treatment of complex sulphides in ammonium chloride solutions, Hydrometallurgy, vol. 28, No. 2, Feb. 1992, pp. 149-161 (Year: 1992).*

\* cited by examiner

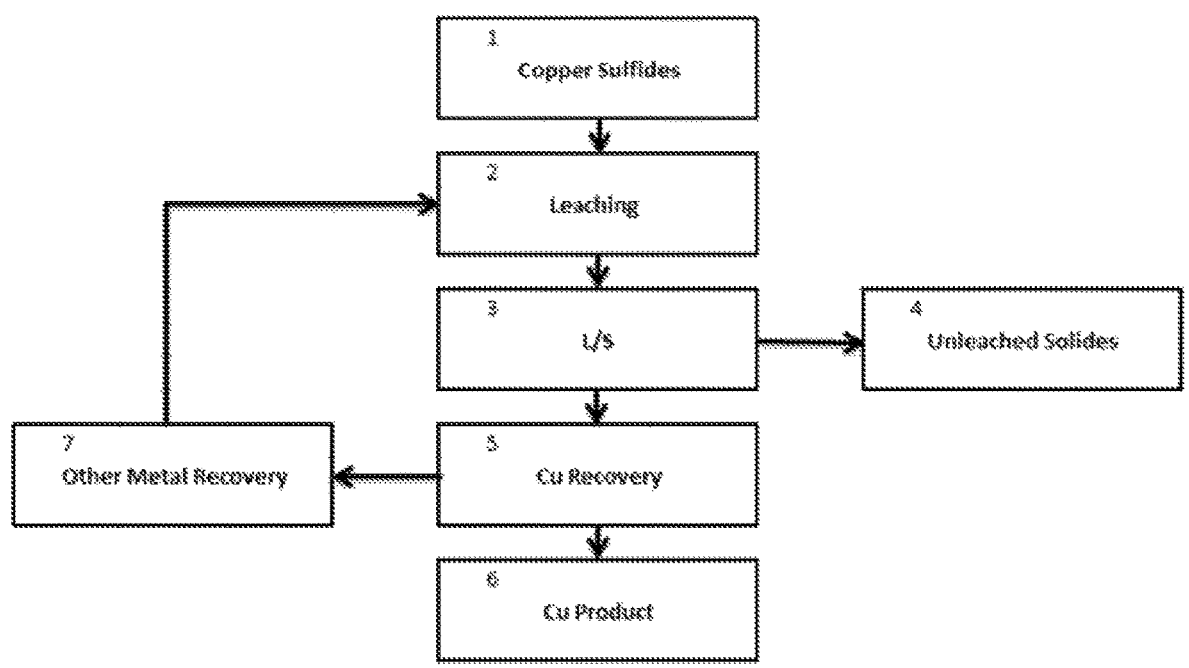

RECOVERY OF COPPER FROM COPPER-CONTAINING SULFIDE ORES

CROSS-REFERENCE TO RELATED APPLICATIONS

This application claims priority to U.S. provisional application Ser. No. 62/146,953 filed on Apr. 13, 2015. The disclosure of the above-referenced application is incorporated herein by reference in its entirety.

This invention relates to the recovery of copper from sulfide ores, and in particular to non-pyrometallurgical processes for the recovery of copper from such ores.

It is well-known that copper is usually recovered from copper sulfide minerals through pyrometallurgical processes, such as a roasting process. Pyrometallurgical processes present a number of well-known issues, including relatively high energy usage, and production of greenhouse gas, dust, and other undesirable emissions.

Successful Hyrdrometallurgical processes such as heap leaching with sulfuric acid to dissolve the copper and then processing to recovery the copper as metal using solvent extraction and electrowinning have been developed for recovery of copper from oxide ores. Approximately, 30% of the world's copper is processed using this standard commercial technique while the rest of the production is produced from copper sulfide ores using pyrometallurgical techniques. Despite many attempts, no commercially satisfactory hydrometallurgical process for recovering copper from copper sulfide ores such as chalcopyrite is known by the inventors to be in use.

SUMMARY OF THE INVENTION

Generally, embodiments of this invention provide a hydrometallurgical process for the recovery of copper from copper sulfides, including both binary copper sulfides, such as covellite (CuS), chalcocite ($Cu_2S$) and villamaninite ($CuS_2$) and other $Cu_xS_y$ compounds, as well as copper containing sulfides such as chalcopyrite $CuFeS_2$, or enargite ($Cu_3AsS_4$), bornite ($Cu_5FeS_4$)

According to a preferred embodiment of the present invention, a process for recovery of copper from copper sulfide minerals comprises the steps of leaching the copper sulfide minerals with an aqueous ammonium chloride solution at between about 40° C. and about 95° C. at 1 atmosphere; separating the leachate from the residue, and extracting the copper from the leachate and reconstituting the ammonium chloride.

The leaching step can be accomplished at a pH of between about 1 and about 10, and can take between about 1 hour and about 12 hours, depending upon the concentration of copper within the ore, the mineralogy, and its granulometry.

The copper can be extracted from the leachate through solvent extraction or electrowinning.

BRIEF DESCRIPTION OF THE DRAWINGS

FIG. 1 is a flowchart of a preferred embodiment of a method of recovering copper from copper sulfide ores in accordance with the principles of the present invention,

DETAILED DESCRIPTION

A preferred embodiment of a process of recovering copper from copper sulfides is indicated generally as in FIG. 1. An aqueous ammonium chloride solution is mixed with copper sulfides in agitated tanks as 2. The ammonium chloride solution dissolves the copper sulfide according to this simplified, or a similar reaction, in the agitated tanks. The copper sulfide mineral is represented by $CuS_{n/2}$:

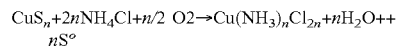

Cupric chloride is involved in the reaction for dissolving the copper sulfides and changes to cuprous chloride. The cupric chloride is regenerated by the following reaction and continues to dissolve further sulfides, hence it is not consumed.

$2CuCl+O_2+2NH_4Cl \rightarrow 2CuCl_2+2H_2O+2NH_3$ The sulfide ore can be include both binary cooper sulfides, such as covellite (CuS), chalcocite ($Cu_2S$) and villamaninite, ($CuS_2$) and other $Cu_xS_y$ compounds, as well as any copper containing sulfides such as chalcopyrite $CuFeS_2$ or enargite ($Cu_3AsS_4$) or bornite ($Cu_5FeS_4$). The ore is preferably milled to a particle size distribution (P80) of no more than about 100 microns, and more preferably no more than about 40 microns, and most preferably no more than about 25 microns. Particle size can determined by either laser diffraction particle size analysis or sieve analysis. This can be accomplished with typical commercial equipment and are typical sizes from copper concentrators.

The concentration of ammonium chloride is preferably between about 100 g/l and about 350 g/l, and more preferably between about 150 g/l and 300 g/l %, and most preferably between 200 g/l % and 250 g/l %. The pH of the solution is preferably between about 1 and about 10. The temperature of the solution is preferably between about 40° C. and about 95° C., more preferably between about 60° C. and about 90° C., and most preferably between about 75° C. and about 85° C. In addition the solution can contain NaCl, KCl and other chloride species that provide chloride for driving force or other ammonia species to provide ammonia for complexing desired metals such as copper. Copper in the form of cupric is maintained to enhance leaching of the sulfides. The cupric content is preferably in the range of 0.5 g/l to 5 g/l, and more preferably between 1 g/l and 4 g/l, and most preferably between 2 g/l and 3 g/l.

The leaching time can vary from about 1 hour minutes to about 12 hours, depending upon the concentration of copper within the ore, the mineralogy, particle size distribution and its granulometry.

Upon completion of the leaching, the contents of the 2 can separated by liquid solid separation techniques such as a filter or other. The liquid leachate is transferred to the copper recovery circuit 5, while the solids containing primarily element sulfur and gangue, which can be appropriately disposed of in 4.

In the copper recovery circuit 5, the copper can be extracted from the leachate using the following techniques but not limited to such as ion exchange, solvent extraction, electrowinning and other know precipitation techniques.

Copper can be recovered by using an ion exchange process where the leached solution is run through a metal selective resin. Copper ions attach to the resin beads and are removed from the solution. An acidic regenerate solution is then run through the resin causing the copper to be released from the beads into the regenerate solution. In this manner a purified, concentrated solution can be achieved.

Copper can be recovered through solvent extraction by allowing the copper containing leach solution to mix with an organic solution of a different solubility. The two solutions are agitated and copper is transferred to the organic solution once the solutions resettle. In this manner a purified, concentrated solution can be achieved.

Copper can be recovered through electrowinning by the electrodeposition of copper from solution onto a cathode. Sheets of copper metal can then be stripped from the cathode.

Copper can be recovered through cementation by using a metal powder that is lower in the galvanic series than copper. The addition of the metal powder causes the copper in solution to precipitation as the metal powder dissolves into the solution. This process can also apply to recovery of other metals in solution, such as lead or silver.

The copper can be produced in various products (6) with a preferred product of electrowinned copper greater than 99.99% purity. The resultant leachate can be sent to another circuit to recover other desired metals that leached with the copper sulfide such as, but not limited to, Ag, Au, Pb, Zn, Co and Ni at 7. The leachate is then recycled back to the leaching tanks in 2 for reuse in the metal leaching system.

EXAMPLES

The following examples provide an indication of the invention, but are not limited to these specific examples.

Example 1

Leaching

50 Grams of Chalcopyrite Concentrate, Having the Composition:
Cu 25.0%, Pb 2.8%, Zn 0.9%, Fe 26.0%
was slurried with 1 L of solution containing 220 g/l of $NH_4Cl$, 100 g/l NaCl, 6 g/l KCl, and 7 g/l $CuCl_2$. The slurry was agitated at a pH of 7 for 6 hrs at 80° C. and bubbling $O_2$. The Cu extraction at 6 hours was 81.5%. In addition, the extraction for Zn, Pb and Ag were 54.6%, 1.27% and 77.4%, respectively. The Fe was essentially unleached.

Example 2A

Copper Extraction

50 Grams of Chalcopyrite Concentrate, Having the Composition:
Cu 27.2%, Pb 2.6%, Zn 1.1%, Fe 31.3%
was slurried with 1 L of solution containing 110 g/l of $NH_4CL$, 100 g/l NaCl, 6 g/l KCl, and 7 g/l $CuCl_2$. The slurry was agitated at a pH of 7 for 6 hours at 80° C. and bubbling $O_2$. The Cu extraction at 6 hours was 89.9%. In addition, the extraction for Zn, Pb and Ag were 66.4%, 0.91% and 100.0%, respectively. The Fe was essentially unleached.
The copper-containing leachate solution from Example 1, containing 21.3 g/l Cu was then transferred to a metal extraction system where it was processed by using ion exchange. Ion exchange testing was performed using a jacketed, flow controlled, 1000 mL column filled with a copper selective resin. Leachate from selected leaching experiments were blended together and fed though the column at a controlled flow rate and temperature. The solution exiting the column was depleted of copper, but could be treated further to recover other metals and/or recycled back into the leach system. Once the leach solution had passed through the system, the resin was rinsed with deionized water and then eluted with sulfuric acid. The eluate was then processed in a laboratory scale electrowinning cell. The copper was able to be extracted at 99% efficiency into a sulfuric acid.

Example 2B

Copper Extraction

The copper-containing leachate solution from Example 1, containing 21.3 g/l Cu was then transferred to a metal extraction system where it was processed by using solvent extraction technique.
A series of preliminary solvent extraction scoping tests were conducted on the bench scale. The extractant in the SX experiment was 15 vol % LIX 984N in in kerosene. Leachate (8.3 g/L copper in $NH_4Cl$ at pH 1.33) and organic were mixed using a wrist-action shaker for 30 minutes at A/O ratios of 1:2, 1:1, 2:1, 5:1, and 10:1 to produce an extraction isotherm. It can be deduced that LIX 984N is capable of extracting copper from the ammonium chloride solution at pH values normally observed in sulfuric acid leaching solutions.
An additional series of tests were conducted with a similar leachate at pH 6.03 at the A/O ratios listed previously. The extractions were 99+% at each A/O ratio at the higher leachate pH. These experiments indicated the ability of solvent extraction using a commercial hydrooxime reagent to extract copper from the $NH_4Cl$ leachate. The copper was able to be extracted at 99+% efficiency into sulfuric acid.

Example 2C

The copper-containing leachate solution from Example 1, containing 21.3 g/l Cu was then transferred to an electrowinning system for the direct electrowinning of the copper from the $NH_4Cl$ solution. This was done by using a standard bath cell to recover the copper at >99.99% purity meeting commercial grade copper.

Example 2D

50 Grams of Chalcopyrite Concentrate, Having the Composition:
Cu 30.1%, Pb 2.7%, Zn 1.0%, Fe 26.4%
was slurried with 1 L of solution containing 220 g/l of $NH_4CL$, 100 g/l NaCl, 6 g/l KCl, and 6 g/l $CuCl_2$. The slurry was agitated at a pH of 1 for 6 hours at 80° C. and bubbling $O_2$. The Cu extraction at 6 hours was 61.9%. In addition, the extraction for Zn, Pb and Ag were 42.3%, 98.2% and 69.0%, respectively. The Fe was essentially unleached.

Example 2E

50 Grams of Chalcopyrite Concentrate, Having the Composition:
Cu 27.5%, Pb 2.7%, Zn 1.0%, Fe 26.6%
was slurried with 1.12 L of solution containing 201 g/l of $NH_4CL$, 91 g/l NaCl, 5.5 g/l KCl, and 6.4 g/l $CuCl_2$. The slurry was agitated at a pH of 7 for 6 hours at 90° C. and bubbling $O_2$. The Cu extraction at 6 hours was 90.0%. In addition, the extraction for Zn, Pb and Ag were 74.5%, 0.31% and 92.6%, respectively. The Fe was essentially unleached.

Example 3

A leachate solution of ammonium chloride, containing 2.2 g/L Cu was electrowinned using a tube cell (Electrometals EMEVV) to recover the Cu as copper metal directly from an ammonium chloride solution.

What is claimed is:

1. A process for recovering copper from copper sulfide minerals, the method comprising the steps of:
   leaching copper sulfide minerals with an aqueous solution of ammonium chloride containing cupric chloride at a temperature of between about 75° C. and about 85° C. and a pH of between about 4 and about 7, at atmospheric pressure, to produce a solution of cuprous/cupric chloride.

2. The process according to claim 1, wherein the copper sulfide minerals include at least one of Pb, Zn, Ag, Au, Fe, As, or Sb.

3. The process according to claim 1, having cupric present.

4. The process according to claim 1, having a range of $NH_4Cl$ from 50 g/l to 350 g/l.

5. The process according to claim 1, further comprising at least one of NaCl and KCl.

6. The process according to claim 1, using $O_2$ or air to regenerate the cuprous to cupric.

7. The process according to claim 1, using agitated leach tanks or use in heap leaching.

8. The process according to claim 1, using solvent extraction to recover copper from leach solution.

9. The process according to claim 1, using direct electrowinning of copper from leach solution.

10. A process for recovering copper from copper sulfide minerals, the method comprising the steps of:
    leaching copper sulfide minerals with an aqueous solution of ammonium chloride containing cupric chloride at a temperature of between about 75° C. and about 85° C. and a pH of between about 4 and about 7, at atmospheric pressure, to produce a solution of cuprous/cupric chloride:
    filtering the solution resulting from the leaching step;
    subjecting the filtered solution to recover the copper as a product.

11. The process according to claim 10, wherein the copper sulfide minerals include at least one of Pb, Zn, Ag, Au, Fe, As, or Sb.

12. The process according to claim 10, having cupric present.

13. The process according to claim 10, having a range of $NH_4Cl$ from 50 g/l to 350 g/l.

14. The process according to claim 10, further comprising at least one of NaCl and KCl.

15. The process according to claim 10, using $O_2$ or air to regenerate the cuprous to cupric.

16. The process according to claim 10, using agitated leach tanks or use in heap leaching.

17. The process according to claim 10, using ion exchange to recover copper from leach solution.

* * * * *